(12) United States Patent
Wiedmann et al.

(10) Patent No.: US 11,988,171 B2
(45) Date of Patent: May 21, 2024

(54) ROCKET ENGINE SECTION HAVING A POROUS INNER WALL PORTION AND METHOD FOR MANUFACTURING A ROCKET ENGINE SECTION

(71) Applicant: ArianeGroup GmbH, Taufkirchen (DE)

(72) Inventors: Dietmar Wiedmann, Raubling (DE); Daniel Eiringhaus, Garching (DE); Hendrik Riedmann, Weyarn (DE); Fabian Riss, Großkarolinenfeld (DE)

(73) Assignee: ARIANEGROUP GMBH, Taufkirchen (DE)

( * ) Notice: Subject to any disclaimer, the term of this patent is extended or adjusted under 35 U.S.C. 154(b) by 0 days.

(21) Appl. No.: 17/858,636

(22) Filed: Jul. 6, 2022

(65) Prior Publication Data
US 2023/0044769 A1  Feb. 9, 2023

(30) Foreign Application Priority Data

Aug. 9, 2021  (DE) .......................... 102021120637.5

(51) Int. Cl.
*F02K 9/64*    (2006.01)
*B33Y 80/00*    (2015.01)

(52) U.S. Cl.
CPC ................ *F02K 9/64* (2013.01); *B33Y 80/00* (2014.12); *F05D 2260/202* (2013.01); *F05D 2260/203* (2013.01)

(58) Field of Classification Search
CPC ..... F02K 9/64; F02K 9/40; F02K 9/42; F02K 9/346; F02K 9/343; F02K 9/62; F02K 9/972; F05D 2230/30; F05D 2230/312
See application file for complete search history.

(56) References Cited

U.S. PATENT DOCUMENTS 4,703,620 A  *  11/1987  Niino ........................ B22F 7/06
                                                        60/260
5,363,645 A  *  11/1994  Pellet ........................ F02K 9/64
                                                        60/770
(Continued)

FOREIGN PATENT DOCUMENTS

DE          3320556 A1     12/1983
DE         19730674 A1      1/1999
(Continued)

OTHER PUBLICATIONS

German Patent Office, Office Action in German Patent Application No. 1020211206375 (dated Mar. 22, 2022).
(Continued)

*Primary Examiner* — Thuyhang N Nguyen
(74) *Attorney, Agent, or Firm* — Leydig, Voit & Mayer, Ltd.

(57) ABSTRACT

A rocket engine section includes a combustion chamber body having an inner wall and a channel carrying a cooling medium extending outside and along the inner wall. The rocket engine section further comprises a porous portion integrally formed with the inner wall and integral with the inner wall and adapted to allow the cooling medium carried in the channel to pass from the channel to the interior of the combustion chamber body. A porosity of the porous portion determines a volume flow rate and/or mass flow rate of the cooling medium let through into the interior of the combustion chamber body.

13 Claims, 2 Drawing Sheets

(56) References Cited

U.S. PATENT DOCUMENTS

| | | | |
|---|---|---|---|
| 5,501,011 A | 3/1996 | Pellet | |
| 5,732,883 A * | 3/1998 | Beaurain | F28F 13/003 |
| | | | 239/127.3 |
| 6,151,887 A * | 11/2000 | Haidn | F02K 9/972 |
| | | | 60/257 |
| 6,606,851 B1 | 8/2003 | Herdy, Jr. et al. | |
| 8,057,880 B2 * | 11/2011 | Petervary | B26F 1/24 |
| | | | 428/137 |
| 2019/0299290 A1 | 10/2019 | Kuhns et al. | |

FOREIGN PATENT DOCUMENTS

| | | |
|---|---|---|
| DE | 19901424 B4 | 9/2009 |
| EP | 3549926 A1 | 10/2019 |
| JP | H08-327050 A | 12/1996 |
| JP | 2000-503094 A | 3/2000 |
| JP | 2000-330468 A | 11/2000 |
| JP | 2005-042721 A | 2/2005 |
| JP | 2016-056417 A | 4/2016 |
| JP | 2017-536476 A | 12/2017 |

OTHER PUBLICATIONS

Japanese Patent Application No. 2022-126312, Office Action (dated Jun. 20, 2023).

European Patent Office, Extended European Search Report in European Patent Application No. 22 17 4847, 8 pp. (dated Nov. 15, 2022).

* cited by examiner

ROCKET ENGINE SECTION HAVING A POROUS INNER WALL PORTION AND METHOD FOR MANUFACTURING A ROCKET ENGINE SECTION

CROSS-REFERENCE TO RELATED APPLICATIONS

This patent application claims priority to German application number 102021120637.5, filed on Aug. 9, 2021, which is incorporated herein in its entirety by reference.

FIELD OF THE DISCLOSURE

The present disclosure relates to a rocket engine section having a porous inner wall portion and a method of manufacturing a rocket engine section. In particular, the invention relates to a rocket engine section having a porous portion in an inner wall of a combustion chamber body, wherein the porous portion is integrated into the inner wall as one piece. Furthermore, the invention relates to a method of manufacturing such a rocket engine section by means of additive manufacturing.

BACKGROUND OF THE INVENTION

In rocket engines, for example, their combustion chamber is cooled by means of transpiration cooling to protect the combustion chamber from the hot gases. Here, a propellant component of the rocket engine is usually directed to the inner combustion chamber wall, where it forms a cooling film. To introduce the propellant component, inlays can be provided on the combustion chamber wall which have a porous structure.

DE 199 01 424 B4, on the other hand, suggests making perforation holes through which coolant can flow to the hot gas side and form a transpiration curtain on the inner wall. By dimensioning the perforation holes accordingly, a stabilizing effect against pressure fluctuations can be achieved.

Both porous inlays and perforation holes are very time-consuming and cost-intensive to produce, i.e. to attach to or drill into the inner combustion chamber wall.

BRIEF SUMMARY OF THE INVENTION

Embodiments in accordance with the disclosure, in one aspect, include a rocket engine section that comprises a combustion chamber body having an inner wall and a channel carrying a cooling medium extending outside and along the inner wall. The combustion chamber body encloses at least a portion of a combustion chamber with its inner wall. The combustion chamber body can, for example, be rotationally symmetrical or otherwise adapted to a good flow behaviour of a hot gas flow.

In one aspect, the present disclosure describes a combustion chamber body that has an axial direction which, for example, runs in the direction of flow of the hot gas stream and/or forms the axis of rotational symmetry. Correspondingly, the combustion chamber body may have a circumferential direction that runs, for example, in a plane perpendicular to the axial direction. Accordingly, a radial direction is perpendicular to the axial direction and also in the plane perpendicular to the axial direction. In the present disclosure, terms such as "inside" and "outside" refer to regions or portions that are (closer) to the axis of rotational symmetry or a centre, and further away from the axis of rotational symmetry or the centre, respectively.

BRIEF DESCRIPTION OF THE SEVERAL VIEWS OF THE DRAWING(S)

FIG. 1 schematically illustrates a sectional view of a rocket engine section in accordance with the disclosure.

FIG. 2 schematically illustrates axial and cross-sectional views of a combustion chamber body in accordance with the disclosure.

DETAILED DESCRIPTION OF THE INVENTION

Figure 1:
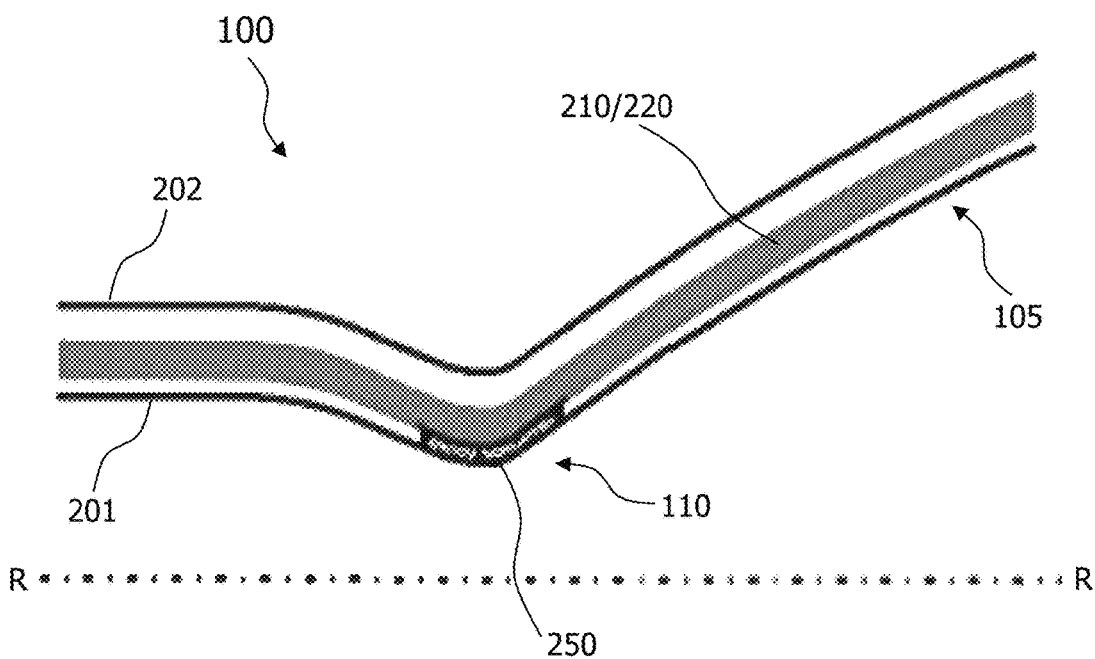

FIG. 1 schematically shows a sectional view of a rocket engine section 100. The sectional view shows the rocket engine section 100 in a sectional plane parallel to and through a rotational symmetry axis R of a combustion chamber body 105 of the rocket engine section 100. The rotational symmetry axis R runs in axial direction. For example, the illustrated rocket engine section 100 includes a combustion chamber throat 110 of the combustion chamber body 105. This combustion chamber throat 110 is usually the narrowest part of the interior of the combustion chamber body 105. For example, in FIG. 1, to the left of the combustion chamber throat 110 may be a combustion chamber head (not shown) into which propellant components are introduced and burn. In FIG. 1, the burning or already burned fuel components are ejected to the right and pass through the combustion chamber throat 110, which is thus exposed to a high thermal load.

The combustion chamber body 105 comprises an inner wall 201 and an outer wall 202, the latter not being discussed in detail. In order to cool the inner wall 201 in particular, at least one channel 210, 220 carrying a cooling medium runs on the outside and along the inner wall. For example, a cooling medium can flow through the channel 210, 220 to the combustion chamber head (not shown on the left in FIG. 1) and thereby cool the combustion chamber body 105 and in particular its inner wall 201. The inner wall 201 can be a wall of the channel 110, 220.

A porous portion 250 is further shown in the particularly stressed region of the combustion chamber throat 110. Of course, such a porous portion 250 may also be arranged at other locations of the combustion chamber body 105 or may also extend over the entire inner wall 201 of the combustion chamber body. This applies both in the axial direction and in the radial direction (perpendicular to the drawing plane in FIG. 1). Furthermore, several porous portions 250 can of course also be provided in the inner wall 201.

The porous portion 250 is formed integrally with the inner wall 201 and is integrated into the inner wall 201. That is, the material forming the porous portion 250 is the same as that forming the inner wall 201. In particular, the porous portion 250 is adapted to guide and allow the cooling medium guided in the channel 210, 220 to pass from the channel 210, 220 to the interior of the combustion chamber body 105. In other words, the porous portion 250 forms a fluidic connection between the channel 210, 220 and the interior of the combustion chamber body 105 (the combustion chamber).

A porosity of the porous portion 250, which is defined by a ratio between void and solid, thereby determines a volume flow rate and/or mass flow rate of the cooling medium allowed to pass into the interior of the combustion chamber body 105. Due to the porosity, the cooling medium flows to the inside of the inner wall 201 and forms a cooling film there. This cooling film provides transpiration cooling directly to the thermally loaded surface of the inner wall 201.

As can be seen from the illustration in FIG. 1, a distance of the inner wall 201 from the axis of rotational symmetry R changes along the axial direction (axis of rotational symmetry R) precisely in the region of the combustion chamber throat 110. The thermal load of the inner wall 201 also changes accordingly. Of course, the thermal load of the inner wall 201 can also change in the axial direction due to the progress of combustion in the combustion chamber.

The porosity of the porous portion 250 can vary in the axial direction and/or in the circumferential direction in order to be adapted to the corresponding thermal load. Thus, a larger porosity can be implemented at the point with the smallest distance to the rotational symmetry axis R. A large porosity means that there are more and/or larger voids (and also more and/or larger interconnections between voids) of the porous portion 250. This also corresponds to a larger volume flow and/or mass flow of the cooling medium reaching the inside of the inner wall 201 through the porous portion 250. Thus, a greater cooling of the inner wall 201 can be achieved.

Figure 2:
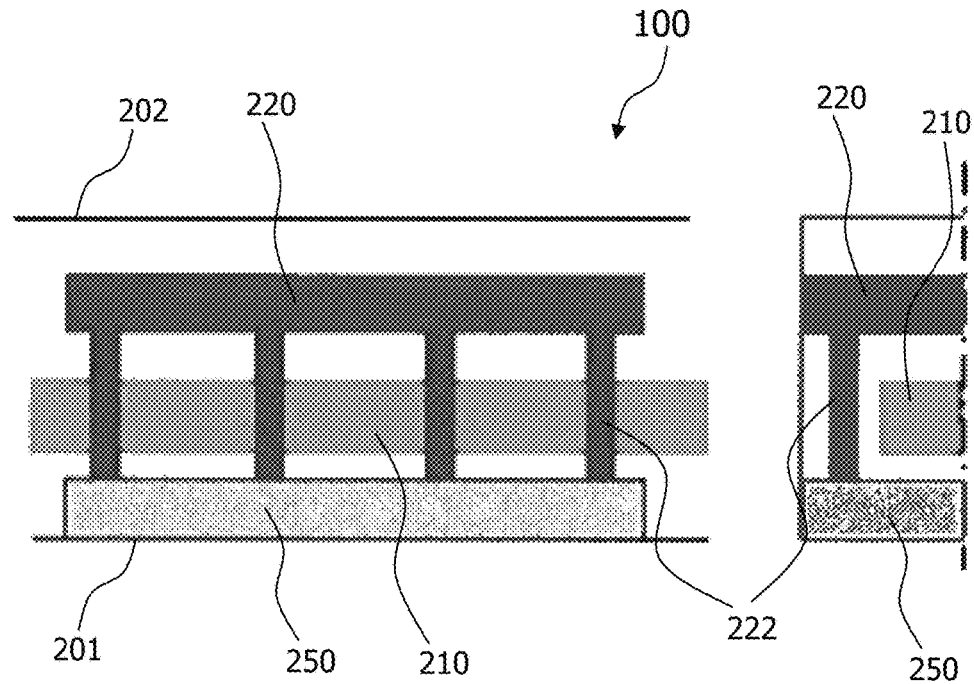

FIG. 2 shows sectional views of a combustion chamber body 105. In particular, a sectional view in the axial direction (left in FIG. 2) and a sectional view in the circumferential direction of the combustion chamber body 105 (right in FIG. 2) are shown. The illustrated rocket engine section 100 shows a dedicated channel 220, which serves to feed the cooling medium to the porous portion 250. The dedicated channel 220 carries a cooling medium that may be externally directed into the porous portion 250. For example, one or more supply lines 222 may be provided for this purpose, which fluidly connect the channel 220 to the porous portion 250. The cooling medium can be, for example, a propellant of the rocket engine.

The dedicated channel 220, of which only a section is visible in FIG. 2, may also be part of a fluid-carrying grid structure that is fluidly connected to the porous portion 250 via the one or more supply lines 222.

The one or more supply lines 222 can also be used to determine a flow rate of the cooling medium into the porous portion 250. On the one hand, the flow rate can be determined by the number of supply lines 222 per defined unit area of the porous portion 250. On the other hand, the flow rate can also be determined by a predefined inner diameter of the supply lines 222. By appropriate selection of supply lines 222, different areas of the porous portion 250 can be supplied with a different volume flow and/or mass flow of the cooling medium. For example, a portion of the supply lines 222 may have a flow rate of the cooling medium that differs from a flow rate of the cooling medium of another portion of the supply lines 222. This may also be determined by an inner diameter and/or number of lines 222 per unit area. In any case, the porous portion 250 may provide different transpiration cooling in the axial direction and/or circumferential direction as different amounts of cooling medium are supplied to different areas of the porous portion 250.

Of course, the porosity of the porous portion 250 may also vary in the axial direction and/or circumferential direction. This can be implemented in addition or as an alternative to the different feed lines 222.

As shown in FIG. 2, the rocket engine section 100 optionally has a cooling channel 210. This, like channel 220, is arranged externally and along the inner wall 201. Unlike channel 220, cooling channel 210 runs independently and carries cooling medium (the same as in channel 220 or a different one) to, for example, a combustion chamber head (not shown). In both cases, the cooling medium is used to cool the inner wall 201 as the cooling medium in the channel 210, 220 absorbs heat from the inner wall 201 (also regardless of whether it is directed into the porous portion 250).

Figure 3:
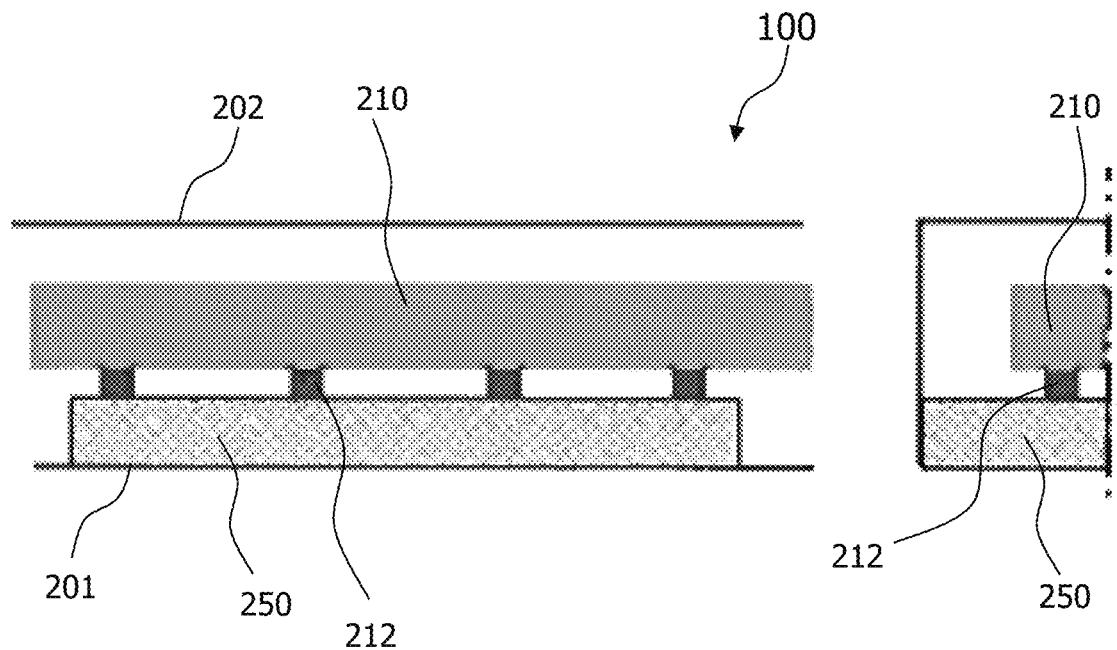
FIG. 3 illustrates further schematic axial and cross-sectional views of a combustion chamber body in accordance with the disclosure.

FIG. 3 also shows sectional views of a rocket engine section 100 corresponding to those shown in FIG. 2. In the rocket engine section 100 shown here, the channel carrying a cooling medium is a cooling channel 210 extending substantially in the axial direction of the combustion chamber body 105, at least in the region shown, and is provided for cooling the inner wall 201 of the combustion chamber body 105. The cooling channel 210, of which only a section is visible in FIG. 3, can also be part of a fluid-conducting grid structure that is fluidly connected to the porous portion 250.

Compared to the structure of FIG. 2, no dedicated channel 220 is required here, making the rocket engine section 100 easier to manufacture. On the other hand, in the configuration of FIG. 2, the flow rate and/or mass flow rate for transpiration cooling at the porous portion 250 can be controlled independently of a cooling medium flow in the channel 210. For example, the cooling channel 210 in FIG. 2 may be used to supply rocket fuel to the rocket engine, the flow rate and/or mass flow of which may need to be controlled differently from cooling at the porous portion 250.

The porous portion 250 in FIG. 3 may be fluidly connected to the channel 210 via one or more supply lines 212. The supply lines 212 may be configured in the same manner as the supply lines 222 described with reference to FIG. 2.

Alternatively, the porous portion 250 may be integrally formed with and integrated into a side wall of the channel 210. In other words, separately manufactured supply lines 212 can be dispensed with. For example, the inner wall 201 may also delimit the cooling channel 210, at least in sections. The cavities of the porous portion 250 thus connect an interior (lumen) of the channel 210 to the combustion chamber (inside of the combustion chamber body 105). By selecting the porosity accordingly, transpiration cooling of the inner wall 201 can vary and be determined depending on the location within the combustion chamber body 105.

Figure 4:
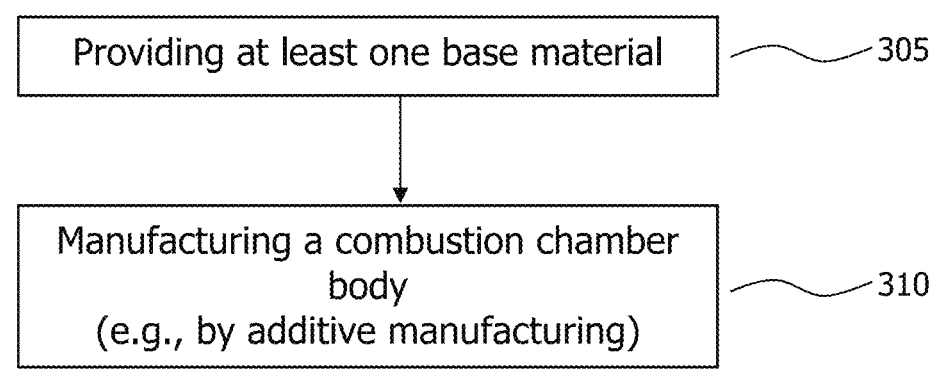
FIG. 4 illustrates a schematic diagram of a method for manufacturing a rocket engine section in accordance with the disclosure.

FIG. 4 shows a schematic flow diagram of a method for manufacturing a rocket engine section 100. In a first step 305, at least one base material for a combustion chamber body 105 is provided. The at least one base material may be, for example, a metal, a metal alloy, or a ceramic. In particular, the base material may be provided in powder form or in liquid form and may be adapted to be fused or bonded together by point energy input.

In a further step 310, a combustion chamber body 105 having an inner wall 201, at least one channel 210, 220 arranged on an outer side of the inner wall 201, and a porous portion 250 integrally formed with the inner wall 201 and integrated into the inner wall 201 is manufactured by additive manufacturing, for example a point energy input into the provided base material. During manufacturing, in particular of the porous portion 250, a fluidic connection between the channel 210, 220 and an interior of the combustion chamber body 105 can be fabricated through the porous portion 250.

This can be done, for example, by omitting predefined areas that form voids of the porous portion 250. In other words, the base material is solidified only in areas around the voids and formed into a structure that forms a fluid-permeable structure through the voids.

Alternatively, energy input during additive manufacturing can be reduced from that required to produce other sections of the combustion chamber body. The reduced energy input results in less bonding of the base material to create a porous structure. Subsequent removal of un-bonded base material leaves the framework forming the porous portion 250.

The embodiments described herein are merely exemplary and serve only to explain the present invention.

In one general aspect, the channel carrying a cooling medium in the disclosed embodiments is arranged on the outside of the inner wall of the combustion chamber body. In other words, the channel is arranged on a side of the inner wall of the combustion chamber body facing away from the combustion chamber. The channel may be arranged directly on an outer side of the jacket forming the inner wall. Furthermore, the jacket may also delimit a section of the channel. Alternatively, or at least in sections, the channel can also be arranged indirectly on the jacket forming the inner wall. In a direct arrangement, efficient cooling can be achieved by absorbing heat directly from the jacket. In an indirect arrangement, an optimal course of the channel carrying a cooling medium can be taken into account in addition to cooling the jacket.

Further, the rocket engine section comprises a porous portion integrally formed with the inner wall and integrated into the inner wall. This means that the porous portion is made of the same material as the inner wall or is continuous with the jacket forming the inner wall. Accordingly, the porous portion has not been manufactured separately and inserted into the jacket, but has been integrated into the inner wall or the jacket forming the inner wall. This can be implemented in particular in the form of additive manufacturing, as will be discussed in more detail.

In addition, the porous portion is adapted to allow the cooling medium carried in the channel to pass from the channel to the interior of the combustion chamber body. In other words, the porous portion is permeable to the cooling medium and forms a fluidic connection between the combustion chamber and the channel.

In particular, a porosity of the porous portion determines a volume flow and/or mass flow of the cooling medium let through into the interior of the combustion chamber body. On the one hand, the porosity is determined by a ratio of a certain volume section of the inner wall and the void volume contained therein. Here, the porosity can also be determined as a ratio between the gross density of the material forming the (normal) inner wall and the density of the porous portion. On the other hand, the porosity in the present disclosure is also determined by a fluid permeability from an outer side to an inner side of the porous portion. In other words, porosity is also determined as a function of a fluidic communication of individual cavities of the porous portion with each other, for example, also in a ratio of the respective volumes.

This special form of a rocket engine section enables transpiration cooling of the inner wall of the combustion chamber body, whereby the porous portion can be integrated cost-effectively and quickly into the inner wall, for example during the manufacture of the inner wall or the combustion chamber body. In particular, additional work steps for the separate production of a porous material, which then has to be inserted into the inner wall of the combustion chamber in openings or recesses to be provided there first, are not necessary. Furthermore, there is no need to fix such an inlay in the inner wall of the combustion chamber, since the porous portion in the present disclosure is formed integrally with the inner wall and is integrated therein. Likewise, no time-consuming and cost-intensive drilling (perforations) need to be made.

In an implementation variant, the porous portion can be limited to a specific area of the combustion chamber body. For example, the porous portion can be integrated into the inner wall where the greatest thermal load is to be expected. Thus, the porous portion has a limited extension in the axial direction. Since most combustion chamber bodies are rotationally symmetrical, the porous portion can be integrated continuously into the inner wall in the circumferential direction. Of course, for static reasons, a plurality of porous portions may be arranged in the circumferential direction, with a section of the inner wall without porosity being arranged between each pair of porous portions. Also optionally, several porous portions can be integrated into the inner wall in a chequerboard pattern, i.e. a section of the inner wall without porosity is arranged between each pair of porous portions in both the axial direction and the circumferential direction. Porous portions arranged diagonally to each other may be in contact or spaced apart by a section of the inner wall without porosity.

In an implementation variant, the porosity of the porous portion can vary in the axial direction and/or circumferential direction of the combustion chamber body. Thus, it is possible to adapt the porosity to the position within the combustion chamber body, whereby also a volume flow and/or mass flow of the cooling medium used for transpiration cooling and thus the transpiration cooling itself are adapted to the position within the combustion chamber body. For example, for a position within the combustion chamber body that is exposed to higher temperatures, a section of greater porosity and thus stronger cooling can be provided than in other sections that are not exposed to such high temperatures.

Varying the porosity can take place in sections or change continuously. In this way, the volume flow and/or mass flow of the cooling medium and the associated transpiration cooling can be adapted to the thermal load of the combustion chamber body without transition. This can be advantageous, for example, where the combustion chamber body also changes continuously in its extent (especially in the radial direction).

In another implementation variant, the porous portion may be arranged at a combustion chamber throat of the combustion chamber body. The combustion chamber throat is a section of the combustion chamber in the axial direction that represents a constriction when viewed in the radial direction. Due to the hot gases that have to pass through this constriction, the inner wall of the combustion chamber body is exposed to particularly high temperatures and is thus subject to high thermal stress. By arranging the porous portion and thereby achieving transpiration cooling, the inner wall of the combustion chamber body can be well protected from these high temperatures.

It is also possible that the porous portion is provided at a transition between the combustion chamber and the nozzle extension. The porous portion can also extend over several areas of the combustion chamber body.

Furthermore, the porosity of the porous portion and thus the achievable cooling can be adapted to the shape of the combustion chamber body. For example, the porosity can vary such that it is indirectly proportional to a size of the combustion chamber body in the radial direction. In other words, the porosity may be greatest where the combustion chamber body is smallest in the radial direction (where opposing inner walls of the combustion chamber body have the smallest distance in the radial direction and form the combustion chamber throat) and decrease as the width of the combustion chamber body increases in the radial direction. This not only allows optimal cooling to be achieved, but also makes efficient use of the available cooling medium (for example, no excessive consumption of cooling medium for transpiration cooling where this is not absolutely necessary).

In a further implementation variant, the channel carrying a cooling medium may be a cooling channel for cooling the inner wall of the combustion chamber body. For example, the combustion chamber body may have at least one cooling channel that extends substantially in the axial direction and runs on an outer side of the jacket or body forming the inner wall and, for example, follows its course as viewed in the radial direction. Alternatively, the channel carrying the cooling medium may be arranged obliquely to the axial direction. For example, the channel may be arranged in a spiral around the combustion chamber. Also alternatively, the channel carrying the cooling medium may be at least a section of a grid structure carrying the cooling medium or a similar arrangement of interconnected cavities.

Each of these channels carrying the cooling medium can be used, for example, to convey fuel to a combustion chamber head. The fuel can flow through the channel in the opposite direction to a hot gas flow in the combustion chamber, or alternatively in the same direction as the hot gas flow. This propellant used to cool the combustion chamber body can be fed (in small quantities) through the porous portion into the interior of the combustion chamber body to accomplish transpiration cooling on the inner wall of the combustion chamber body.

In another implementation variant, the channel carrying a cooling medium may be a dedicated channel serving to supply the cooling medium to the porous portion. In other words, the channel is exclusively for the supply of the cooling medium to the porous portion.

By way of example only, the channel may be arranged separately from other cooling channels in or on the combustion chamber body. Alternatively or additionally, the channel may branch off from a common manifold from which cooling channels or other channels carrying the cooling medium also branch off to further porous portions.

In yet another embodiment, the rocket engine section may further comprise a plurality of supply lines fluidly connecting the channel carrying a cooling medium and the porous portion. The supply lines primarily serve to fluidly connect the channel and the porous portion, for example, to bridge a spatial separation of the channel and the porous portion. Such a spatial separation may be due to a predefined course of the channel on the outside of the combustion chamber body. For example, if there are a large number of such channels along the combustion chamber body, they must run differently at a combustion chamber throat than in regions of the combustion chamber body that have a larger radial extent than the combustion chamber throat due to the taper of the combustion chamber.

In an implementation variant, at least a portion of the plurality of supply lines may have a flow rate of the cooling medium that is different from a flow rate of the cooling medium of the remaining portion of the plurality of supply lines. In other words, the supply lines may also serve a purpose of determining a volume flow rate and/or mass flow rate from the channel to the porous portion (or only a part thereof). This allows the volume flow and/or mass flow to be determined and also optimised in addition to the porosity of the porous portion.

In another implementation variant, the cooling medium may be a rocket propellant. For example, it may be cryogenic propellant and/or liquid propellant that vaporises in the porous portion or as it exits the porous portion into the interior of the combustion chamber body and forms a cooling film on the inner wall of the combustion chamber body. Alternatively, the cooling medium can also be a separate cooling medium, such as a liquefied and/or cryogenic gas or a liquid (water is mentioned here only as an example).

According to another aspect for a better understanding of the present disclosure, a method of manufacturing a rocket engine section comprises providing at least one base material for a combustion chamber body, and manufacturing, by means of additive manufacturing from the at least one base material, the combustion chamber body having an inner wall, at least one channel arranged on an outer side of the inner wall, and a porous portion formed integrally with the inner wall and integrated in the inner wall. In other words, the inner wall of the combustion chamber body, a channel arranged on the outside thereof (for example for guiding a cooling medium) and a porous portion formed in the inner wall and integrated therein are manufactured in a single work step during the manufacturing process.

Alternatively, the inner wall of the combustion chamber body and the porous portion integrated therein may be manufactured during the manufacturing step, with the inner wall forming part of the channel arranged on the outside. The remaining sections of the channel can be attached to the outside of the inner wall in a further manufacturing step to complete the channel.

In particular, additive manufacturing (also referred to as 3D printing or Additive Layer Manufacturing—ALM) can be used to produce the combustion chamber body layer by layer with the components arranged next to or formed and integrated in the inner wall. This allows all the cavities, for example the inside of the channel as well as the cavities forming the porous portion, to be manufactured in a simple, quick and cost-effective manner and in any shape. Compared to the fabrication and insertion of an inlay, this form of fabrication saves many work steps and thus expensive fabrication time.

The base material can be a powdery base material. It is also possible to use a liquid base material. In both cases, the base material can be bonded into a solid structure by applying energy, for example by means of a laser.

In particular, the manufacturing further comprises establishing fluidic communication between the channel and an interior of the combustion chamber body through the porous portion. In other words, a continuous cavity or chain of interconnected cavities is formed from the inside of the inner wall of the combustion chamber body to the interior of the channel.

The minimum height of such a continuous cavity (for example, viewed in the axial direction, if this also represents the manufacturing direction) is determined by the minimum possible layer thickness of a layer of the additive manufacturing process. Similarly, the minimum possible layer thickness of the chosen additive manufacturing process can determine the smallest possible height of the porous portion when viewed in the manufacturing direction. Depending on the choice of manufacturing system, the cavities or solid components of the porous portion can be manufactured in the micrometre range or even in the nanometre range. This makes it possible to achieve very good entry of the cooling medium into the interior of the combustion chamber body as a cooling film. In particular, the volume flow and/or mass flow of the cooling medium through the porous portion can be very finely adjusted and determined.

In particular, a porosity of the porous portion may determine a volumetric flow rate and/or mass flow rate of a fluid flowing from the channel into the interior of the combustion chamber body.

In an implementation variant, manufacturing the porous portion of the combustion chamber body may comprise omitting, during additive manufacturing, predefined regions forming a fluid-permeable structure in at least a portion of the inner wall. In other words, the regions of the porous portion forming a cavity and/or the channel and/or a supply conduit and/or other cavities for carrying cooling medium are omitted during additive manufacturing and the base material is not bonded to form a solid structure. For example, no energy can be applied to the base material in these areas so that it does not fuse or stick together in these areas.

For example, the solid components of the porous portion may have a lattice-like, for example uniform, structure. Alternatively, the solid components of the porous portion may have a sponge-like structure, with at least some of the cavities of the sponge being interconnected or at least permeable to the cooling medium. The structure of the porous portion may be chosen such that the volume flow and/or mass flow of the cooling medium through the porous portion is determined thereby.

In another implementation variant, manufacturing the porous portion of the combustion chamber body via additive manufacturing may comprise reducing the energy input than for manufacturing other portions of the combustion chamber body. In other words, additive manufacturing may apply a specific energy input to produce the solid components of the combustion chamber body and/or channel that is optimised to bond the base material into a statically and thermally resilient structure. In order to achieve and/or determine the porosity of the porous portion, the energy input can be chosen to be lower in at least part of the porous portion. This results in less fusion or bonding of the base material, creating a looser framework. Subsequent removal of non-fused or bonded base material leaves the porous portion.

According to another aspect for better understanding of the present disclosure, a rocket engine comprises a rocket engine section according to the first aspect or any of the implementation variants described therewith.

According to yet another aspect for a better understanding of the present disclosure, the rocket engine section according to the first aspect forms a combustion chamber for a rocket engine.

The aspects and implementation variants described above can of course be combined without this being explicitly described. Any of the described implementation variants is thus to be seen as optional to any implementation variant or already combinations thereof. The present disclosure is thus not limited to the individual embodiments and variants in the order described or to any particular combination of the aspects and implementation variants.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rocket engine section comprising:
   a combustion chamber body having an inner wall, the inner wall extending along an axial direction and along a circumferential direction, the inner wall including a porous portion formed integrally with the inner wall and integrated into the inner wall;
   at least two channels carrying a cooling medium, which both run on the outside and along the inner wall, the at least two channels are offset from one another; and
   a plurality of supply lines fluidly connecting the at least two channels carrying the cooling medium and the porous portion, and adapted to allow the cooling medium carried in the at least two channels to pass from the at least two channels to the interior of the combustion chamber body via the porous portion;
   wherein a porosity of the porous portion determines a volume flow rate and mass flow rate of the cooling medium allowed to pass into the interior of the combustion chamber body; and wherein the porous portion provides different transpiration cooling effects along at least one of the axial direction and the circumferential direction by permitting different amounts of cooling medium to be supplied to different areas of the porous portion through the plurality of supply lines.

2. The rocket engine section according to claim 1, wherein the porosity of the porous portion varies in at least one of the axial direction and the circumferential direction of the combustion chamber body.

3. The rocket engine section according to claim 1, wherein the porous portion is arranged at a combustion chamber throat of the combustion chamber body.

4. The rocket engine section according to claim 1, wherein at least one of the at least two channels carrying a cooling medium is a cooling channel for cooling the inner wall of the combustion chamber body.

5. The rocket engine section according to claim 1, wherein at least one of the at least two channels carrying a cooling medium is a section of a grid structure carrying the cooling medium for cooling the inner wall of the combustion chamber body.

6. The rocket engine section according to claim 1, wherein at least one of the at least two channels carrying a cooling medium is a dedicated channel serving only to supply the cooling medium to the porous portion.

7. The rocket engine section according to claim 1, wherein at least a first portion of the plurality of supply lines has a flow rate of the cooling medium that is different from a flow rate of the cooling medium of the remaining portion of the plurality of supply lines, the first portion of the plurality of supply lines having at least one of different inner diameters or different number of supply lines per unit area fluidly connecting the at least two channels with the different areas of the porous portion.

8. The rocket engine section according to claim 1, wherein the cooling medium is a rocket propellant.

9. A method of manufacturing a rocket engine section comprising:

providing at least one base material for a combustion chamber body; and manufacturing, using an additive manufacturing process from the at least one base material, the combustion chamber body having an inner wall, the inner wall extending along an axial direction and along a circumferential direction, at least two channels, both arranged on an outer side of the inner wall, the at least two channels are offset from one another, a porous portion that is integrally formed with the inner wall and integrated into the inner wall, and a plurality of supply lines fluidly connecting the at least two channels and the porous portion;

wherein the manufacturing further comprises establishing the fluid communication between the at least two channels and an interior of the combustion chamber body through the plurality of supply lines and the porous portion, the plurality of supply lines being adapted to provide different transpiration cooling effects along at least one of the axial direction and the circumferential direction by permitting different amounts of cooling medium to be supplied to different areas of the porous portion; and wherein a porosity of the porous portion determines a volume flow rate and/or mass flow rate of a fluid flowing from the at least two channels through different areas of the porous portion into an interior of the combustion chamber body.

10. The method of claim 9, wherein manufacturing the porous portion of the combustion chamber body comprises omitting, during additive manufacturing, predefined regions forming a fluid-permeable structure in at least a portion of the inner wall.

11. A method of manufacturing a rocket engine section comprising:

providing at least one base material for a combustion chamber body; and manufacturing, using an additive manufacturing process from the at least one base material, the combustion chamber body having an inner wall, the inner wall extending along an axial direction and along a circumferential direction, at least one channel arranged on an outer side of the inner wall, a porous portion that is integrally formed with the inner wall and integrated into the inner wall, and a plurality of supply lines fluidly connecting the at least one channel and the porous portion;

wherein the manufacturing further comprises establishing the fluid communication between the channel and an interior of the combustion chamber body through the plurality of supply lines and the porous portion, the plurality of supply lines being adapted to provide different transpiration cooling effects along at least one of the axial direction and the circumferential direction by permitting different amounts of cooling medium to be supplied to different areas of the porous portions;

wherein a porosity of the porous portion determines a volume flow rate and/or mass flow rate of a fluid flowing from the channel through different areas of the porous portion into an interior of the combustion chamber body; and wherein manufacturing the porous portion of the combustor body by additive manufacturing comprises reducing an energy input for bonding the at least one base material than for manufacturing other portions of the combustor body to create a porous structure.

12. The method of claim 9, wherein the plurality of supply lines includes at least one of supply lines having different inner diameters or supply lines installed at a different density per unit area of the porous portion to provide the different volume flow rate and/or mass flow rate of a fluid flowing from the at least two channels through different areas of the porous portion.

13. A rocket engine section comprising:

a combustion chamber body having an inner wall, the inner wall extending along an axial direction and along a circumferential direction, the inner wall including a porous portion formed integrally with the inner wall and integrated into the inner wall;

at least two channels carrying a cooling medium, which both run on the outside and along the inner wall, the at least two channels are offset from one another; and a plurality of supply lines fluidly connecting the at least two channels carrying the cooling medium and the porous portion, and adapted to allow the cooling medium carried in the at least two channels to pass from the at least two channels to the interior of the combustion chamber body;

wherein a porosity of the porous portion determines a volume flow rate and mass flow rate of the cooling medium allowed to pass into the interior of the combustion chamber body;

wherein the plurality of supply lines includes at least one of: supply lines having different inner diameters, or supply lines installed at a different density per unit area of the porous portion, to provide a different volume flow rate and/or mass flow rate of a fluid flowing from the at least two channels through different areas of the porous portion;

wherein, during operation, the porous portion is adapted to provide different transpiration cooling effects along at least one of the axial direction and the circumferential direction by permitting different amounts of cooling medium to be supplied to different areas of the porous portion through the plurality of supply lines.

\* \* \* \* \*